United States Patent [19]
Halasa

[11] 3,872,177
[45] Mar. 18, 1975

[54] POLYMERIZATION CATALYST
[75] Inventor: Adel F. Halasa, Bath, Ohio
[73] Assignee: The Firestone Tire & Rubber Company, Akron, Ohio
[22] Filed: June 21, 1973
[21] Appl. No.: 372,360

Related U.S. Application Data

[60] Division of Ser. No. 139,804, May 3, 1971, Pat. No. 3,767,632, which is a continuation-in-part of Ser. No. 761,831, Sept. 23, 1968, abandoned.

[52] U.S. Cl............. 260/665 R, 252/430, 252/431 L, 260/83.7, 260/94.2 M
[51] Int. Cl. .............................................. C07f 1/02
[58] Field of Search........ 252/430, 431 L; 260/83.7, 260/94.2 T, 665 R

[56] References Cited

UNITED STATES PATENTS

| | | | |
|---|---|---|---|
| 3,294,768 | 12/1966 | Wofford | 252/431 L X |
| 3,326,881 | 6/1967 | Uraneck et al. | 252/431 L X |
| 3,409,603 | 11/1968 | Halasa et al. | 252/431 L X |
| 3,454,546 | 7/1969 | Wilcoxen | 252/430 X |
| 3,644,312 | 2/1972 | Cheng et al. | 252/430 X |
| 3,726,844 | 4/1973 | Halasa | 260/665 X |

*Primary Examiner*—Patrick P. Garvin

[57] ABSTRACT

Potassium hydroxide is complexed with a lithium hydrocarbon which is a polymerization catalyst.

3 Claims, No Drawings

POLYMERIZATION CATALYST

This application is a division of application Ser. No. 139,804, now U.S. Pat. No. 3,767,632, which is a continuation-in-part of my application Ser. No. 761,831 filed Sept. 23, 1968, now abandoned.

This invention relates to an improvement in the copolymerization of a conjugated diene containing 4 to 6 carbon atoms with styrene or other hydrocarbon monovinyl aromatic monomer. The catalyst used is a lithium hydrocarbon, and preferably an alkyllithium with potassium hydroxide, often as a complex.

The use of potassium hydroxide with an alkyllithium as a catalyst for the preparation of butadiene-styrene, etc. copolymer increases the rate of polymerization of the styrene with the butadiene so that a copolymer of constant composition is formed. The microstructure of the diene portion of the copolymer remains substantially constant. No gel is formed. When the content of styrene in the polymerization reaction mixture is greater than 18 per cent and the ratio of the moles of potassium in the catalyst to the moles of lithium is at least 1.00, no block styrene is formed. When the styrene content is below 18 per cent, no block styrene is formed regardless of the Li/K ratio. The copolymer contains substantially the same amount of styrene as added to the reaction mixture. In this respect the use of KOH is different from the use of alkali metal alkoxides with an alkyllithium (as disclosed in Wofford U.S. Pat. No. 3,294,768) because in such prior art the vinyl-content of the polymer produced varies with the Li/K ratio. The fact that the vinyl-content is substantially constant in the process of this invention simplifies the control of the process. Thus, the polymer produced by this process has several advantages. It is useful as a replacement for butadiene-styrene, etc. copolymers prepared by other methods.

A complex is usually formed by heating a substantial amount of the complexing potassium hydroxide with the alkyllithium initiator in the absence of air, and preferably in an inert solvent, such as an aliphatic hydrocarbon solvent or benzene or toluene. A mixture of alkyllithium initiators may be used. The complex can be recovered and stored or shipped if kept out of contact with air.

The conjugated diene may be butadiene-1,3, isoprene, piperylene or 2,3-dimethylbutadiene-1,3 or a mixture thereof.

The vinyl aromatic monomers which may be used include, for example, styrene, alpha-methyl styrene, vinyl toluene, vinyl naphthalene, 3,5-diethylstyrene, 2,4,6-trimethylstyrene, 2-ethyl-4-benzylstyrene, 4-p-tolylstyrene, 4-(4-phenyl-n-butyl)styrene, 4-methoxystyrene, 3,5-diphenoxystyrene, 3-decoxystyrene, 4-dimethylaminostyrene, 4,5-dimethyl-1-vinylnaphthalene, 3-ethyl-1-vinylnaphthalene, 2,4-diisopropyl-1-vinylnaphthalene, 3,6-di-p-tolyl-1-vinylnaphthalene, 6-cyclohexyl-1-vinylnaphthalene, 8-phenyl-1-vinylnaphthalene, 6-benzyl-2-vinylnaphthalene.

The alkyllithium initiators that may be used are well known and include those mentioned in U.S. Pat. No. 3,317,918 which is included herein by reference as disclosing alkyllithiums useful as initiators as well as known methods of producing copolymers of butadiene or isoprene with styrene, etc., including known temperature ranges and amounts of hydrocarbon-lithium initiator. From 0.1 or 0.5 or preferably 1.0 to 10 or even 15 or 20 mols or greater amounts of potassium hydroxide may be used per mol of the alkyllithium initiator. Any usual initiator amount of alkyllithium will be used, such as from 0.001 to 0.5 part of lithium per 100 parts of monomer.

The polymerization may be carried out at any temperature customarily used for such polymerizations, usually just below the boiling point of the solvent, but other temperatures may be employed usually between about 50° and 266° F. Atmospheric pressure will generally be employed, but pressures above or below atmospheric may be used.

The invention is illustrated by the following examples.

EXAMPLE 1

The initiator complex is advantageously prepared by heating 1 molar equivalent of the complexing potassium hydroxide with 5 to 10 molar equivalents of the alkyllithium. It should be understood that the amount of the complexing compound is used in excess of that which enters into the reaction. The complexing is advantageously done in an inert solvent. The following is illustrative:

To a 400-ml. solution of n-butyllithium (0.30 mmole per ml) containing 120 mmole of n-butyllithium there was added 100 mmoles of potassium hydroxide. The flask was then shaken vigorously for several hours. The potassium complexed with the lithium in the n-butyllithium. The solution turned deep wine red. This contained substantially equimolar parts of lithium and potassium. There was undissolved and unreacted potassium hydroxide in the bottom of the solution. It is not necessary to separate this, but usually the solution of the complexed initiator will be decanted from such a residue. The complexed initiator may be separated from the solvent if it is to be stored or shipped. Such recovery will be attended with precaution.

EXAMPLE 2

A solution was prepared of 400 milliliters of 25-per cent isoprene in heptane. This was divided equally in eight bottles. Then 17.5 ml. of distilled styrene was added to each bottle. The bottles were catalyzed with 1.0 ml (1.50 mmole) of n-butyllithium (BuLi) and the amounts of potassium hydroxide listed in the following table:

TABLE I

| Run | BuLi, ml. | BuLi, mmole | RANDOMIZING AGENT | |
|---|---|---|---|---|
| | | | KOH, ml. | KOH, mmole |
| A | 1.0 | 1.50 | 0.30 | 0.81 |
| B | 1.0 | 1.50 | 0.50 | 1.35 |
| C | 1.0 | 1.50 | 0.75 | 2.16 |
| D | 1.0 | 1.50 | 1.0 | 2.70 |
| E | 1.0 | 1.50 | 2.0 | 5.40 |
| F | 1.0 | 1.50 | 3.0 | 8.00 |
| G | 1.0 | 1.50 | 4.0 | 10.80 |
| H | 1.0 | 1.50 | 5.0 | 13.50 |

These bottles were placed in a 50° C. bath and heated for several hours (12 to 16 hours). After polymerization was completed the polymers were coagulated and analyzed. The content of the different stereo isoprenes (cis-1,4, trans-1,4, and 3,4) and the per cent of styrene in each sample is given, together with the dilute solution viscosity (D.S.V.). No gel was formed in any of the runs, and in Runs E to H in which the K/Li ratio was over 1.00, no block copolymer was found.

TABLE II

| RUN | Cis-1,4 % | Trans-1,4 % | 3,4 % | STYRENE %* | D.S.V. |
|---|---|---|---|---|---|
| A | 71.6 | 16.3 | 12.0 | 30.2 | 0.50 |
| B | 71.7 | 16.0 | 12.3 | 30.1 | 0.51 |
| C | 72.9 | 14.9 | 12.2 | 27.7 | 0.51 |
| D | 71.5 | 16.1 | 12.2 | 29.7 | 0.52 |
| E | 71.5 | 15.5 | 13.1 | 30.8 | 0.54 |
| F | 71.7 | 15.1 | 13.0 | 29.0 | 0.54 |
| G | 71.7 | 15.1 | 13.0 | 28.8 | 0.60 |
| H | 71.0 | 15.5 | 13.4 | 32.5 | 0.67 |

*By infra-red analysis.

The table indicates that the copolymer contains the same amount of styrene as that charged initially, and that the polymer was indeed a copolymer and not a homopolymer.

The n-butyllithium and potassium hydroxide may be complexed and added to the reaction mixture as a complex, instead of being added separately.

EXAMPLE 3

Four bottles were charged with 400 ml. of 30-percent butadiene-1,3 in hexane and 20 ml. styrene. The reaction was catalyzed with 1.0 mmole of n-butyllithium (BuLi) with varying amounts of potassium hydroxide as given below.

| RUN | BuLi, mmole | KOH ml. | KOH mmole |
|---|---|---|---|
| A | 1.0 | 0.20 | 0.54 |
| B | 1.0 | 0.40 | 1.08 |
| C | 1.0 | 0.60 | 1.42 |
| D | 1.0 | 1.0 | 2.7 |

The bottles were placed in a 50° C. bath for 12 to 16 hours. The reactions were terminated and the products analyzed, with the results recorded in the following table:

TABLE III

| RUN | 1,2% | BLOCK STYRENE, % | D.S.V. | GEL | STYRENE, % |
|---|---|---|---|---|---|
| A | 9.6 | 14.07 | 1.27 | None | 28.4 |
| B | 10.7 | 7.27 | 1.05 | None | 30.6 |
| C | 12.2 | None | 1.33 | None | 28.0 |
| D | 12.0 | None | 1.84 | None | 28.5 |

Polymerization with butyllithium in the absence of KOH produces a higher percentage of block copolymer than recorded in the above table. The table shows that by using sufficient KOH, substantially no block copolymer was produced when the ratio of K/Li was over 1.00. The per cent of 1,2-unsaturation remained substantially constant when no block copolymer was formed.

EXAMPLE 4

Fifteen hundred grams of butadiene (25 percent) in hexane was charged into a one-gallon reactor. n-Butyllithium (5.0 mmole) and KOH in mineral oil (10.0 mmole) were added initially. Styrene (100 grams) was also added.

The batch was heated to 200° F. for polymerization. Samples A and B were taken after 10 minutes and after 30 minutes. They were cooled to room temperature. Both samples were dried and analyzed for the content of the different stereo polymers and for styrene. The results are recorded below.

TABLE IV

| SAMPLE | Cis-1,4 | Trans-1,4 | 1,2 | % STYRENE |
|---|---|---|---|---|
| A | 33.0 | 55.6 | 11.4 | 18.6 |
| B | 33.6 | 55.6 | 11.4 | 18.6 |

No block styrene was formed. No gel was formed. There was no substantial change in the stereo structure of the copolymers.

EXAMPLE 5

A one-gallon reactor equipped with mechanical stirrer driven by an electric motor was charged with 1500 g. of 25 percent 1,3-butadiene in heptane solution. To this was added 100 g. of styrene. This was catalyzed with 6.0 mmole n-butyllithium and 15 mmoles of KOH in mineral oil emulsifier. The temperature of the polymerization was adjusted to 200° F. and allowed to polymerize till 100 per cent conversion was obtained in 3 hours. The polymer was removed from the reactor and stabilized and dried on the drum drier. The polymer was then analyzed by nuclear magnetic resonance, infra-red spectroscopy and refractive index and was found to be of constant composition, i.e. without any blocks. The product contained no free styrene or gel. The copolymer had the following content of stereopolymers and styrene:

TABLE V

| RUN NO. | Cis-1,4% | Trans-1,4% | 1,2% | STYRENE, % |
|---|---|---|---|---|
| 1 | 33.1 | 55.3 | 11.6 | 22.9 |
| 2 | 36.6 | 52.4 | 11.0 | 21.2 |
| 3 | 33.0 | 55.6 | 11.4 | 18.6 |
| 4 | 33.6 | 55.4 | 11.0 | 18.4 |
| 5 | 33.7 | 55.0 | 11.3 | 18.3 |

EXAMPLE 6

Polymerizations were run using a constant ratio of butyllithium to potassium hydroxide at 90°, 150° and 180° F. All were run with a monomer content of 65 per cent butadiene and 35 per cent styrene, in hexane, at the same level of potassium hydroxide. At the lowest polymerization temperature, there was a very rapid uptake of styrene and many points on the curve show a styrene content exceeding the initial 35 per cent. By increasing the temperature to 150° F., the addition rate of the styrene decreased, and at 180° F., the KOH has substantially no effect on the rate of styrene addition.

Thus, the beneficial effect of the potassium hydroxide on the polymerization is evident more particularly within the temperature range of 50° to 266° F.

I claim:

1. A complex of (1) one mole of a hydrocarbon lithium which is a polymerization catalyst and (2) 0.1 to 20 moles of potassium hydroxide.

2. The complex of claim 1 which is a complex of n-butyllithium and potassium hydroxide.

3. The complex of claim 2 in which 1 to 10 moles of potassium hydroxide are present per mole of hydrocarbon lithium.

* * * * *